United States Patent [19]

Dikis et al.

[11] Patent Number: 5,261,988
[45] Date of Patent: Nov. 16, 1993

[54] MAKING LARGE-DIAMETER PIPE

[75] Inventors: Byron Dikis; John Charaktinos, both of Moschaton Piraeus, Greece

[73] Assignee: George Aristovoulos Petzetakis, Moschaton Piraeus, Greece

[21] Appl. No.: 885,751

[22] Filed: May 18, 1992

Related U.S. Application Data

[63] Continuation-in-part of Ser. No. 586,609, Sep. 21, 1990, abandoned.

[30] Foreign Application Priority Data

Sep. 22, 1989 [DE] Fed. Rep. of Germany ....... 3931614

[51] Int. Cl.[5] ................. B29C 47/30; B29C 47/86; B29C 53/68
[52] U.S. Cl. ................. 156/244.13; 156/195; 156/500; 264/558; 264/560; 264/572; 264/177.17; 264/210.2; 264/281; 264/210.5; 425/377; 425/378.1; 425/380; 425/322; 425/391
[58] Field of Search ............. 264/173, 103, 177.1, 264/177.17, 210.1, 210.2, 248, 558, 560, 563, 572, 281, 210.5; 156/244.13, 162, 196, 195, 500; 425/376.1, 377, 378.1, 380, 322, 391

[56] References Cited

U.S. PATENT DOCUMENTS

| | | | |
|---|---|---|---|
| 2,671,939 | 3/1954 | Everhart et al. | 156/244.13 |
| 3,574,810 | 4/1971 | Tournery et al. | 264/173 |
| 3,617,415 | 11/1971 | Hawerkamp | 156/244.13 |
| 3,668,288 | 6/1972 | Takahashi | 264/173 |
| 3,917,500 | 11/1975 | Petzetakis et al. | 264/173 |

Primary Examiner—Jeffery Thurlow
Assistant Examiner—Mathieu Vargot
Attorney, Agent, or Firm—Herbert Dubno; Andrew Wilford

[57] ABSTRACT

A large-diameter plastic pipe is made by extruding from an extruding-nozzle assembly a hollow thermoplastic strip having an outer rectangular cross section and formed with longitudinally extending outer walls and webs having inner surfaces and defining a plurality of longitudinally extending internal cells separated by the webs from one another. Substantially only the inner surfaces of the outer walls and the cell-forming webs are then cooled to size the strip and provide it with a predetermined compressive strength stable up to a predetermined critical pressure of the design strength while externally shielding external surfaces of the strip and thereby preventing cooling of same. Then the walls are heated at external contact surfaces thereof to a temperature sufficient for welding and the strip is coiled onto a drum helically with contiguous turns of the strip engaging at the contact surfaces and axially pressing these contact surfaces together to butt weld the turns together with an axial pressure below the critical pressure of the design strength.

10 Claims, 3 Drawing Sheets

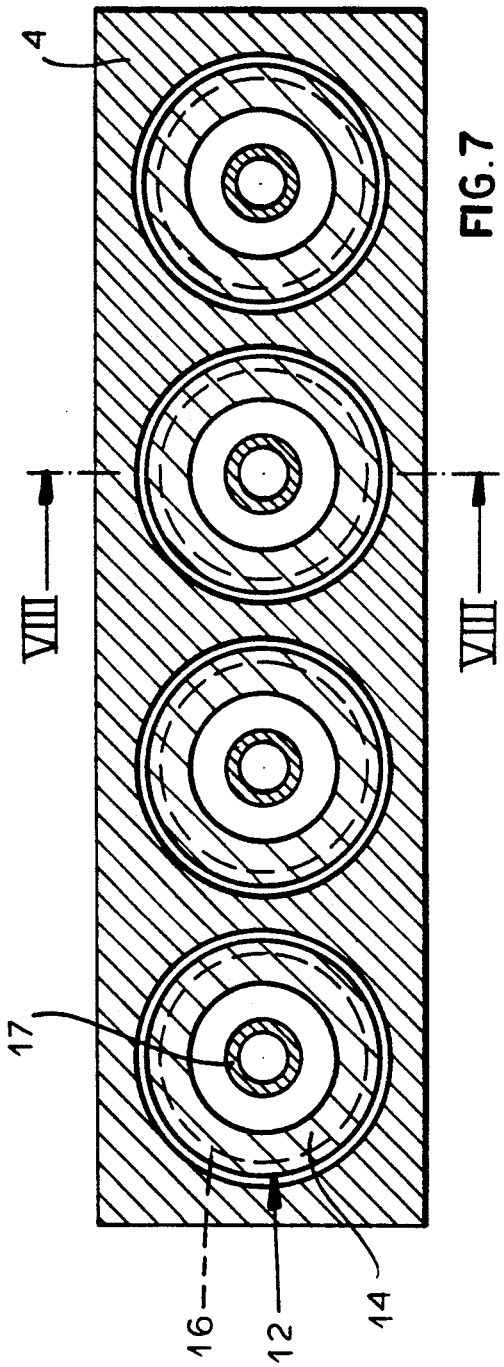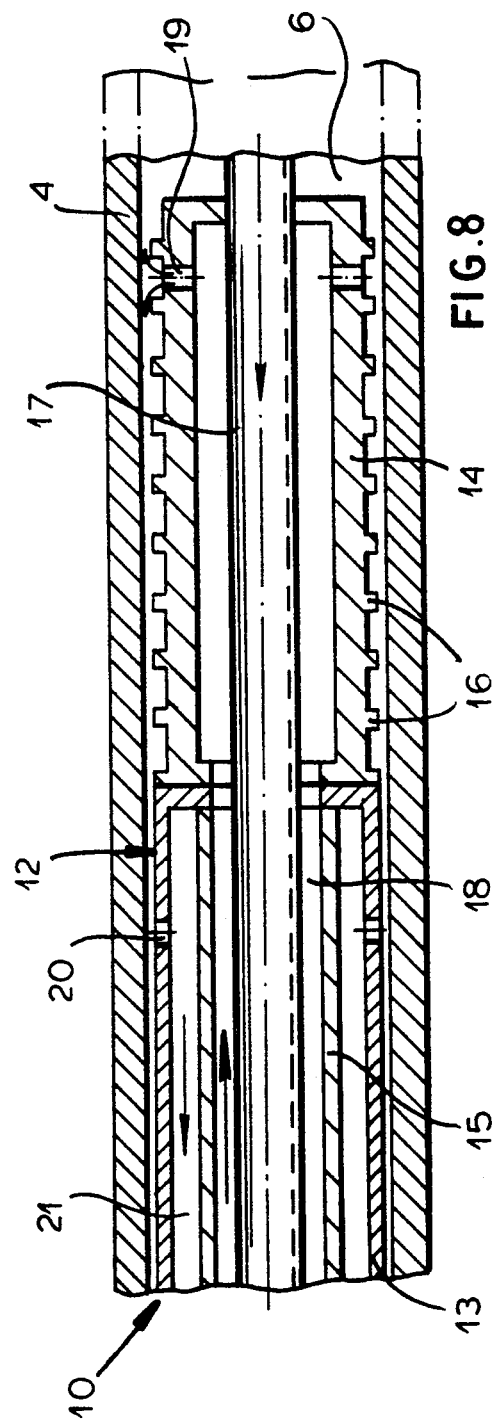

MAKING LARGE-DIAMETER PIPE

CROSS REFERENCE TO RELATED APPLICATIONS

This application is a continuation-in-part of copending patent application 07/586,609 (now abandoned) filed Sep. 21, 1990 and claiming the priority of German application 3,931,614 itself filed Sep. 22, 1989.

FIELD OF THE INVENTION

The present invention relates to the manufacture of large-diameter pipe. More particularly this invention concerns a method and apparatus for making such pipe of an extrudable synthetic resin.

BACKGROUND OF THE INVENTION

Insulated large-diameter or -caliber plastic pipe is made by first extruding a rectangular-section thermoplastic-resin profile or tube. This tube is then wound up on a mandrel in laterally tightly engaging turns that are welded together where they contact each other laterally to form a mainly hollow wall.

Basically, any desired thermoplastic suitable for the manufacture of tubes ca be used for the plastic from which the hollow plastic profile is made. More particularly, the plastic may be a polyolefin such as polyethylene (PE) or polypropylene (PP). The plastic may have an integrated reinforcement of fibers and be provided with finely divided fillers, more particularly, mineral fillers as described in above-cited application 07/583,376.

British patent 1,438,322 describes the formation of pipe from a hollow plastic profile in the form of a single-cell profile of square or rectangular external cross-section. The hollow plastic profile is extruded with a substantially round internal cross-section. A cooling fluid is introduced into this hollow plastic profile during extrusion and is passed through at least one turn. The turns are welded in contiguous relationship at an appropriate temperature and with an appropriate axial pressure.

It has been found that flanges with overlapping weld seams or a positive lock of the turns can be dispensed with in the manufacture of tubes, and particularly large-caliber pipes, made from hollow plastic profiles. The known steps utilize the fact that a hollow plastic profile at deformation temperature can without difficulty be coiled with contiguous turns. Axial pressures required to weld the adjacent contact walls are then produced preferably kinematically. At the same time, a support core produced in the hollow plastic profile by the introduction of cooling fluid acts to prevent collapse of the profile. This allows adequate compression and upsetting in the axial direction for a perfect welding of the surfaces of the adjacent contact walls of the helically coiled hollow plastic profile.

In the known steps, it is possible to adjust conditions so that the axial pressure produces a permanent deformation and changes the cross-section of the hollow plastic profile on welding. What occurs depends on the value to which the axial pressure, i.e. the upsetting or compression, is set and on the value to which the temperatures are set, and also on the degree of cooling after extrusion.

The known steps have proved satisfactory, but result in plastic pipes of relatively considerable weight for a predetermined design stress. They can be manufactured only with hollow plastic profiles whose rectangular cross-sectional shape differs only little from a square cross-sectional shape.

OBJECTS OF THE INVENTION

It is therefore an object of the present invention to provide an improved system for making large-diameter hollow-wall plastic pipe.

Another object is the provision of such an improved system which produces such pipe which is of relatively light weight but of normal or even better strength.

SUMMARY OF THE INVENTION

To this end, according to the invention, the hollow plastic profile having an elongate rectangular overall cross-section is molded in an extrusion tool or die to form a multicell profile having outer profile walls and cell-forming webs and is sized by internal cooling of the outer profile walls and of the cell-forming webs and given a design strength which is stable up to a predetermined critical pressure. The calibrated multicell profile set to the design strength is again heated at contact surfaces for butt welding to the welding temperature of the thermoplastic material, and a butt-welded seam between the turns is welded with an axial pressure below the critical pressure of the design strength.

The internal cooling can be carried out at the same time as the extrusion and/or thereafter, i.e. is effected at the latest subsequent to the extrusion operation. During the internal cooling the external surfaces are actively shielded to prevent them from cooling.

The invention is based on our discovery that it is possible to obtain a considerable weight reduction without impairing the stress-absorbing properties, provided the hollow plastic profile used has an elongate rectangular cross-section and, in the latter, a plurality of likewise rectangular cells are separated from one another by cell-forming webs. The outer wall of the profile and the cell-forming webs may be constructed with relatively thin wall thickness, which allows considerable weight reduction. A hollow plastic profile of this kind, however, cannot be coiled into a pipe in the known manner described in the introduction and be welded turn-wise by the application of axial pressure. Unless other steps are taken, the plastic strip would bulge outward at the deformation temperature required and under the influence of the axial pressure required for welding.

The invention prevents this by the internal cooling and the resultant stabilization and setting of the design strength. Also, an elongate multicell hollow plastic profile of this kind cannot be used without sizing, because the outer walls of the profile would collapse in the cell area This would be visually disturbing and also impair the moment of inertia of the surface of the hollow plastic profile and hence the annular rigidity and stability of the complete pipe.

The invention is based on the discovery that adequate internal cooling of the outer walls and of the cell-forming webs causes the multicell hollow plastic profile to be simultaneously externally sized and be given a design strength in the sense of conventional engineering such that it can take the axial pressure required to make the butt-welded seam between the adjacent turns without the risk of bulging.

This is possible because the axial pressure does not have to be too high, a fact ensured by heating the contact surfaces. The butt-welded seam between the turns can always be welded at an axial pressure below the critical pressure of the design strength. The length of the rectangular cross-section may be between 100% and 500% or even more than the height or thickness of the rectangular overall cross-section of the hollow plastic profile. The hollow plastic profile may have a number of cells.

Generally, the internal cooling is produced by cooled components of the extrusion die and/or cooling components connected thereto. The sizing and the design strength are set by the temperature gradient during cooling and by the cooling time. According to a preferred embodiment, the internal cooling is effected by a cooled liquid of predetermined cooling temperature. Surprisingly, the invention also achieves very accurate external sizing of the hollow plastic profile by the internal cooling if the described procedure is carried out and the design strength is set to an adequate value. Nevertheless, within the context of the invention it is possible to additionally carry out external cooling to improve the external sizing as a result of or by sizing tools.

The extrusion tool or die in accordance with the invention has an outer tool and an inner tool for the cooling and sizing of the extruded strip t provide it with the design compressive strength enabling it to be pressed against a previous turn of the helix in the formation of the helical seam. The inner tool has a cell-forming mandrel with cooling components with spaced peripheral ribs in the form of rings or helices. A return tube is spacedly located within the mandrel so that coolant is forced between the return tube and the surrounding cooling component or mandrel and emerges into the regions of the ribs via bores in the cooling components. The mandrel can have evacuation bores recovering the coolant from the extruded strip and extending through the mandrel outward of the supply channel for the coolant.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 7 is a corresponding section to FIG. 2 through another embodiment of the invention; and FIG. 8 is a section taken along the line VIII—VIII of FIG. 7.

SPECIFIC DESCRIPTION

Figure 1:
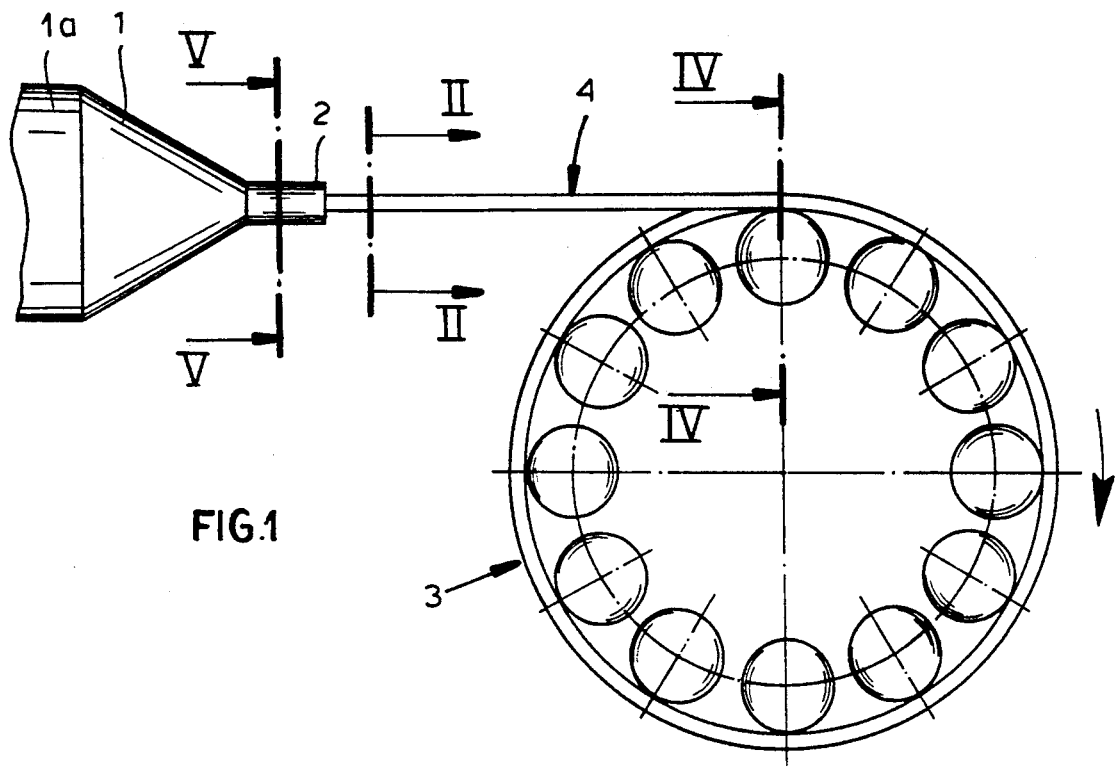
FIG. 1 is a diagrammatic side elevational view of an installation arranged for the process according to the invention.

FIG. 1 shows a tool head 1 of a plastic extruder 1a to which a cooling extension 2 is connected. A rotating drum 3, which may also be termed a coiling mandrel, is on the right. In detail this installation may be otherwise constructed so as largely to correspond to the known steps already described in the introduction (see, for example, the above-cited British patent).

Figure 4:
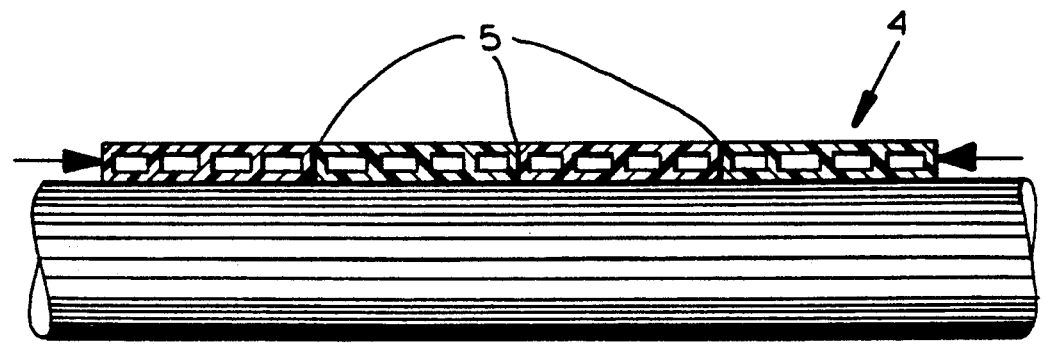
FIG. 4 is a section taken along line IV—IV of FIG. 1, in part, to an enlarged scale compared with FIG. 1.

A comparison of FIGS. 1 and 4 shows how a thermoplastic hollow profile 4 having a rectangular cross-section is extruded and while still fairly deformable is coiled on the drum 3 with contiguous turns. During the coiling operation the turns are welded together at contact surfaces 9 (FIG. 2) at a butt-welded seam 5 using axial pressure and heat.

Figure 2:
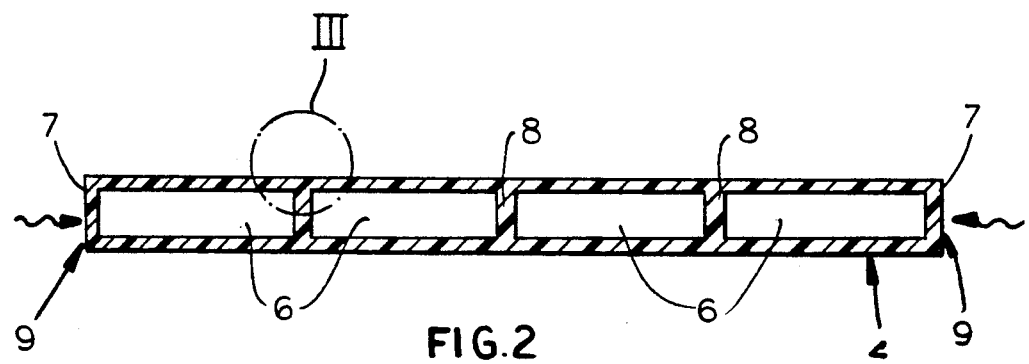
FIG. 2 is a section taken along line II—II through the article shown in FIG. 1 to a much larger scale than that of FIG. 1.
Figure 3:
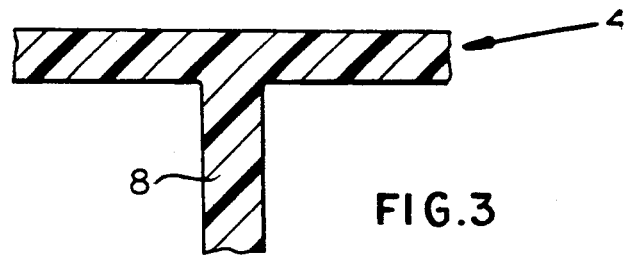
FIG. 3 is a view of the detail indicated at III in FIG. 2 drawn to a still larger scale.

It will be apparent particularly from FIG. 2 that the hollow plastic profile 4 is provided with an elongate rectangular cross-section and is constructed as a multicell profile with four cells 6 in the illustrated embodiment. The hollow plastic profile 4 has outer profile walls 7 and cell-forming webs 8. It is molded in the tool head 1 in an appropriate extrusion tool and is sized during that operation and/or thereafter by an internal cooling of the outer profile walls 7 and of the cell-forming webs 8. The resulting sizing is an external sizing although it is effected by internal cooling. At the same time, however, the hollow plastic profile 4 is, as a result of this internal cooling, given a design strength which is stable up to a predetermined critical pressure, and this applies even at deformation temperature. The double hatching in FIG. 3 shows that the internal cooling statically results in a shell formation and ultimately a box girder structure which has the predetermined design strength.

The sized multicell hollow plastic profile 4 adjusted to the design strength is reheated to the welding temperature of the thermoplastic at the contact surfaces 9, e.g. by irradiation of the corresponding contact surfaces 9 with infrared rays as indicated by wavy arrows in FIG. 2. The butt-weld seam 5 between the turns is welded with an axial pressure below the critical pressure of the design strength as indicated by the arrows in FIG. 4. The axial pressure indicated by the arrows is generally about 10% to 15% less than the critical pressure of the design strength. The internal cooling is effected by a cooled cooling fluid, e.g. water or oil.

Figure 5:
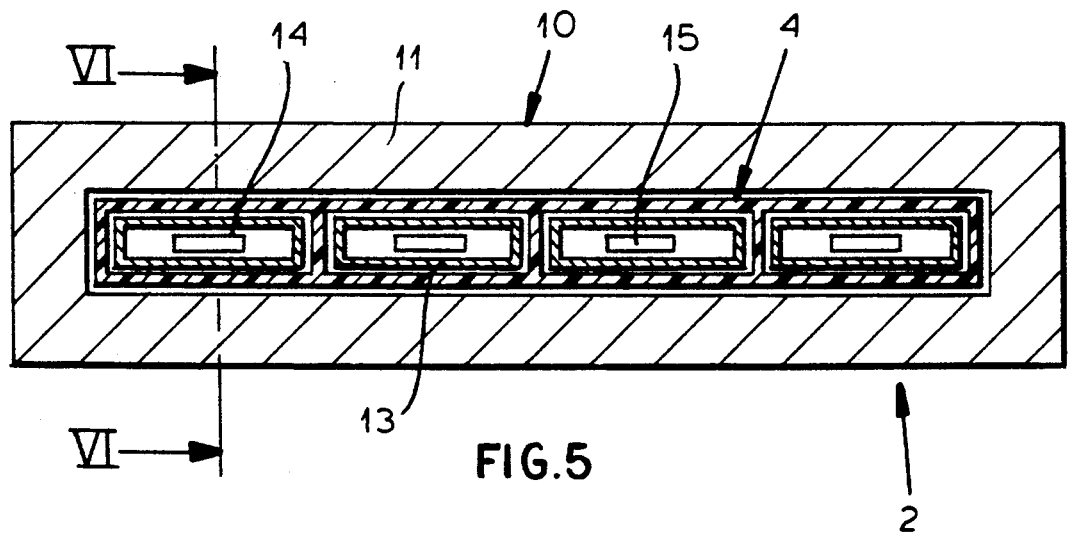
FIG. 5 is a section to the same scale as FIG. 2 taken long line V—V of FIG. 1.
Figure 6:
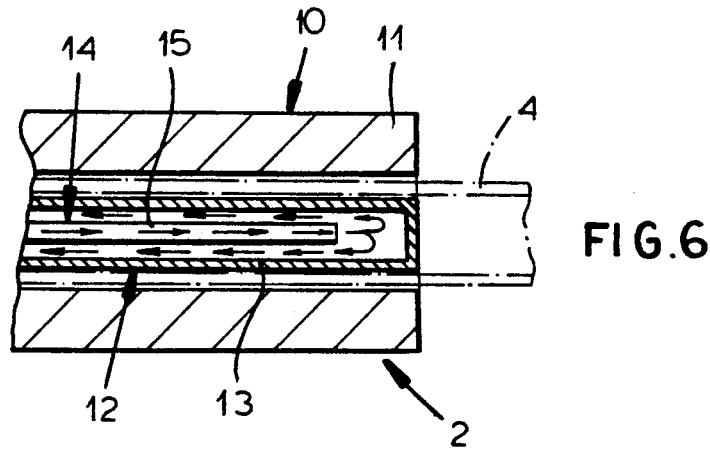
FIG. 6 is a section taken along the line VI—VI of FIG. 5.

FIGS. 5 and 6 illustrate details of an extrusion tool or die 10 especially arranged for performing the method according to the invention and disposed in the tool head 1. The extrusion tool 10 comprises an outer tool 11 and an inner tool 12. The latter is provided with hollow cell-forming mandrels 13. The cell-forming mandrels 13 and/or cooling components 14 connected thereto are constructed so as to be coolable. To this end, a cooling tube 15 extends into the entire length of the cell-forming mandrels 13 and the connected cooling components 14, but in such manner that the cooling fluid supplied via a cooling tube 15 can emerge from the latter. It is deflected at the closing end of the cell-forming mandrels 13 or cooling components 14 and flows back around the exterior of the cooling tube 15 which can be of thermally insulated construction. The cooling fluid flow path could also be reversed. FIG. 5 shows part of the outer tool 11 which also could be cooled. The steps described are suitable particularly for the production of large-caliber plastic pipes of the construction described from polyvinyl chloride.

The construction of another extrusion tool 10 for performing the process according to the invention will be apparent from FIGS. 7 and 8. This extrusion tool 10 also consists of an outer tool 11 and an inner tool 12, the latter comprising cell-forming mandrels 13. A comparison of FIGS. 1 and 8 will show that in the embodiment according to FIGS. 7 and 8 the cell-forming mandrels 13 and the adjoining cooling components 14 also extend into a zone which is no longer surrounded by the outer tool 11.

The cooling components 14 adapted to the individual mandrels are connected to the mandrels 13. The cooling components 14 comprise spaced peripheral ribs 16 in the form of rings or helices. A return tube 17 for a coolant is disposed in the center of the mandrels 13 and of the cooling components 14. As already described the coolant may be any cooled liquid, and particularly water or oil. The coolant can be fed via an annular chamber 18 between the return tube 17 and the cooling component outer wall.

Connected to the annular chamber 18 is a coolant supply tube 15 which surrounds the return tube 17 in the mandrels 13. At the end of the cooling components 14 the coolant passes via bores 19 into the zone of the ribs 16 already mentioned. The mandrels 13 have evacuation bores 20 for the coolant at least in the area of the mandrel ends. The bores 20 lead into an annular evacuation chamber 21 which surrounds the associated coolant supply tube 15.

The design is also such that a sub-flow of the coolant flows off at the cooling components 14 in the extrusion direction into the cells 6 as shown by arrows in FIG. 8, which on the one hand point into the outflow direction and on the other hand to the bores 20. The coolant can be discharged via the associated return tube 17.

While in the embodiment shown in FIGS. 2 to 6 the cells 6 of the hollow plastic profiles 4 have a rectangular cross-section on the inside, it will be seen from FIG. 7 that the cells 6 of the hollow plastic profiles 4 in this case have a round cross-section internally. This embodiment of the extrusion tool is particularly suitable for the manufacture of large-caliber plastic pipes from polyethylene. The hollow plastic profiles 4 are first extruded in the conventional manner and undergo sizing mainly in the area outside the outer tool 11 on the mandrels 13. Sizing continues as far as the cooling components 14 which, however, are used primarily for cooling. The coolant flowing off via the annular evacuation chambers 21 is already heated in comparison with the coolant leaving the cooling components 14, and this assists the sizing operation.

We claim:

1. A method of making a large-diameter plastic pipe comprising the steps of:
   a) extruding from an extruding-nozzle assembly a hollow thermoplastic strip as a multicell profile having an outer rectangular cross section and formed with longitudinally extending outer walls having inner surfaces and with internal webs also having inner surfaces and defining a plurality of longitudinally extending internal rectangular-section cells separated by the webs from one another;
   b) internally cooling substantially only the inner surfaces of the outer walls and of the cell-forming webs to size the strip and provide it with a predetermined compressive strength stable up to a predetermined critical pressure of the design strength, the internal cooling being performed by directly contacting the inner surfaces of the strip with the nozzle assembly and passing a coolant through the nozzle assembly without contacting the coolant directly with the inner surfaces of the strip and without substantially cooling external surfaces of the strip;
   c) thereafter heating the walls substantially only at external contact surfaces thereof to a temperature sufficient for welding without substantially heating the inner surfaces of the walls and webs and coiling the strip onto a drum helically with contiguous turns of the strip engaging at the contact surfaces to butt weld the turns together; and
   d) butt welding adjacent turns of the strip together by axially pressing the contact surfaces of each turn of the strip against the contact surfaces of a previous turn of the strip with an axial pressure below the critical pressure of the design strength.

2. The process defined in claim 1 wherein the strip is internally cooled at the same time as it is formed by extrusion.

3. The process defined in claim 1 wherein the strip is internally cooled in step b) subsequent to extrusion and prior to coiling on the drum.

4. The process defined in claim 1 wherein the internal cooling of step b) is produced by cooled components of an extrusion die through which the strip is extruded.

5. The process defined in claim 1 wherein the strip is sized and the compressive strength is set by a temperature gradient during cooling and a cooling time thereof.

6. The process defined in claim 1 wherein the internal cooling is effected by a cooling liquid of a predetermined cooling temperature.

7. An apparatus for producing a large-diameter pipe, the apparatus comprising:
   an extruder having an extrusion die forming a continuous strip of a thermoplastic synthetic resin, the strip having a rectangular cross section and being formed with a plurality of internal cells defined by internal webs and external walls, the die having
   respective longitudinally extending tubular mandrels fitting snugly against inner surfaces of the cells and each formed with at least one transversely throughgoing return bore,
   respective longitudinally extending tubular cooling components forming longitudinal extensions of the mandrels and each formed with external ribs and with at least one laterally throughgoing bore,
   respective return tubes extending through the mandrels and respective components, opening into the respective cells, and defining respective annular mandrel and component compartments therewith,
   respective coolant supply tubes surrounding the return tubes and opening into the respective component compartments;
   means for feeding a fluid coolant through the supply tubes to the mandrel compartments, for withdrawing the coolant from the mandrel compartments and through the return tube, and thereby sizing and imparting a predetermined compressive strength to the strip by internally cooling the mandrels and components by flowing the coolant longitudinally in both directions from the component bores along the respective cells so as to cool the inner surfaces of the cells without substantially cooling outer surfaces of the strip, the compressive strength being stable up to a predetermined critical pressure of the design strength at which the strip is axially deformable, the walls being heated to a welding temperature;

a coiling drum; and means for coiling the strip on the drum while applying to the strip an axial pressure to weld the turns axially together.

8. The apparatus defined in claim 7 wherein the ribs are rings.

9. The apparatus defined in claim 7 wherein the ribs are helices.

10. The apparatus defined in claim 7 wherein the mandrels and the return tubes have circular cross sections.

* * * * *